(12) United States Patent
Sekine

(10) Patent No.: US 8,314,879 B2
(45) Date of Patent: Nov. 20, 2012

(54) DIGITAL CAMERA HAVING AUTOFOCUS CAPABILITY AND CONTINUOUS SHOOTING CAPABILITY

(75) Inventor: Hiroyuki Sekine, Tokyo (JP)

(73) Assignee: Pentax Ricoh Imaging Company, Ltd., Tokyo (JP)

( * ) Notice: Subject to any disclaimer, the term of this patent is extended or adjusted under 35 U.S.C. 154(b) by 443 days.

(21) Appl. No.: 12/551,632

(22) Filed: Sep. 1, 2009

(65) Prior Publication Data
US 2010/0073549 A1 Mar. 25, 2010

(30) Foreign Application Priority Data

Sep. 19, 2008 (JP) ................................. 2008-240292

(51) Int. Cl.
*G03B 13/00* (2006.01)
(52) U.S. Cl. ...................................................... 348/345
(58) Field of Classification Search .................. 348/345
See application file for complete search history.

(56) References Cited

U.S. PATENT DOCUMENTS

| 7,483,071 | B2* | 1/2009 | Koreki ........................... 348/345 |
| 7,634,185 | B2* | 12/2009 | Terayama et al. ................. 396/95 |
| 2005/0012833 | A1* | 1/2005 | Yokota et al. ............. 348/240.99 |
| 2005/0052553 | A1* | 3/2005 | Kido et al. ..................... 348/296 |
| 2006/0262659 | A1 | 11/2006 | Kurosawa |
| 2007/0019942 | A1 | 1/2007 | Kurosawa |
| 2007/0019945 | A1 | 1/2007 | Kurosawa |
| 2008/0002959 | A1* | 1/2008 | Border et al. ................. 396/111 |
| 2009/0135265 | A1* | 5/2009 | Kawamura et al. ........ 348/220.1 |
| 2009/0213249 | A1* | 8/2009 | Ikeda ............................ 348/241 |

FOREIGN PATENT DOCUMENTS

| JP | 2007-17787 | 1/2007 |
| JP | 2007-219389 | 8/2007 |
| JP | 2008-052225 | 3/2008 |

OTHER PUBLICATIONS

English language Abstract of JP 2007-17787, Jan. 25, 2007.
Japan Office action, dated Jun. 19, 2012 along with an english translation thereof.

* cited by examiner

*Primary Examiner* — Chieh M Fan
*Assistant Examiner* — Fayez Bhuiyan
(74) *Attorney, Agent, or Firm* — Greenblum & Bernstein P.L.C.

(57) ABSTRACT

A digital camera includes an imaging system which performs a photographing operation and records captured image files in a buffer memory; an AF system which performs a focus-state detection process, in which the AF system detects a focus state, and a focusing lens group driving process, in which the AF system moves a focusing lens group to an in-focus position; and first and second switches which actuate the AF system and the imaging system, respectively. While the first and second switches are held ON, the digital camera performs a continuous shooting process in which the imaging system repeatedly performs the photographing operation and the AF system repeatedly performs the focus-state detection process. Upon the buffer memory becoming full during the continuous shooting process, the imaging system suspends the photographing operation and the AF system performs the focus-state detection process and the focusing lens group driving process.

9 Claims, 2 Drawing Sheets

DIGITAL CAMERA HAVING AUTOFOCUS CAPABILITY AND CONTINUOUS SHOOTING CAPABILITY

BACKGROUND OF THE INVENTION

1. Field of the Invention

The present invention relates to a digital camera having autofocus capability and continuous shooting capability.

2. Description of the Related Art

A continuous shooting mode in which a series of photos are taken while the release button is held fully depressed (i.e., while the release switch is held ON) is known in the art as a shooting mode of a digital camera (see Japanese Unexamined Patent Publication 2007-017787). In conventional digital cameras, the camera is in an AF lock state (in which autofocus (AF) process is suspended) during continuous shooting. Therefore, even if the camera is in an in-focus state upon the commencement of continuous shooting, the camera sometimes becomes out of focus in the middle of continuous shooting when, e.g., shooting a moving object.

To keep the camera in focus during continuous shooting, an AF process only needs to be performed each time a picture is taken, i.e., each time the main mirror (quick-return mirror) moves down to the photographing position. However, a problem exists with this control slowing down the continuous shooting speed by the amount of time required to perform the AF process.

SUMMARY OF THE INVENTION

The present invention provides a digital camera with an autofocus system in which continuous shooting mode is available, wherein a continuous shooting operation can be performed with minimum loss of continuous shooting speed while producing a minimum number out-of-focus shots.

According to an aspect of the present invention, a digital camera is provided, including an imaging system which performs a photographing operation and records captured image files in a buffer memory; an AF system which performs a focus-state detection process, in which the AF system detects a focus state, and a focusing lens group driving process, in which the AF system moves a focusing lens group to an in-focus position; a first switch that actuates the AF system; and a second switch that actuates the imaging system. While the first switch and the second switch are held ON, the digital camera performs a continuous shooting process in which the imaging system repeatedly performs the photographing operation and the AF system repeatedly performs the focus-state detection process. Upon the buffer memory becoming full during the continuous shooting process, the imaging system suspends the photographing operation and the AF system performs the focus-state detection process and the focusing lens group driving process.

It is desirable for the imaging system to transfer the captured image files stored in the buffer memory to another memory when the buffer memory becomes full during the continuous shooting process, and to resume performing the photographing operation immediately after the imaging system finishes transferring the captured image files stored in the buffer memory to the another memory.

It is desirable for the AF system to operate in one of following three AF modes: a first AF mode in which the AF system performs the focus-state detection process and the focusing lens group driving process upon the first switch being turned ON, and in which the AF system suspends the focusing lens group driving process while the first switch is held ON upon an in-focus state being obtained; a second AF mode in which the AF system repeats the focus-state detection process and the focusing lens group driving process while the first switch is held ON even upon an in-focus state being obtained; and a third AF mode in which the AF system repeats only the focus-state detection process while the first switch is held ON to determine whether a target object is a moving object. During the continuous shooting process, the AF system operates in one of the second AF mode and the third AF mode.

It is desirable for the AF system to determine whether a target object is stationary after operating in the second AF mode when the buffer memory becomes full, and for the AF system determines that the target object is a moving object during the third AF mode, and thereafter the AF system enters the third AF mode when the AF system determines that the target object is stationary.

It is desirable for the AF system to remain operating in the second AF mode when the AF system determines that the target object is not stationary after operating in the second AF mode.

It is desirable for the AF system to enter into one of the second AF mode and the third AF mode to start performing the continuous shooting operation upon the second switch being turned ON when the AF system operates in the first AF mode with the first switch ON.

It is desirable for the first switch and the second switch to be a photometering switch and a release switch, respectively, which are associated with a shutter release button of the digital camera.

It is desirable for the other memory to be a removable memory card.

According to the present invention, an AF process is performed upon the buffer memory becoming full, which makes it possible to make the AF process perform automatically with no reduction of continuous shooting speed, thus making it possible to prevent the continuous shooting mode from failing, in which a large number of blurred images are undesirably produced.

Since the main mirror is in the image viewing position (down position) during an AF process after suspension of picture taking, the user is allowed to view the object through viewfinder during this AF process, which prevents the user from failing to photographically capture images of the object (subject).

The present disclosure relates to subject matter contained in Japanese Patent Application No. 2008-240292 (filed on Sep. 19, 2008) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

Figure 1:
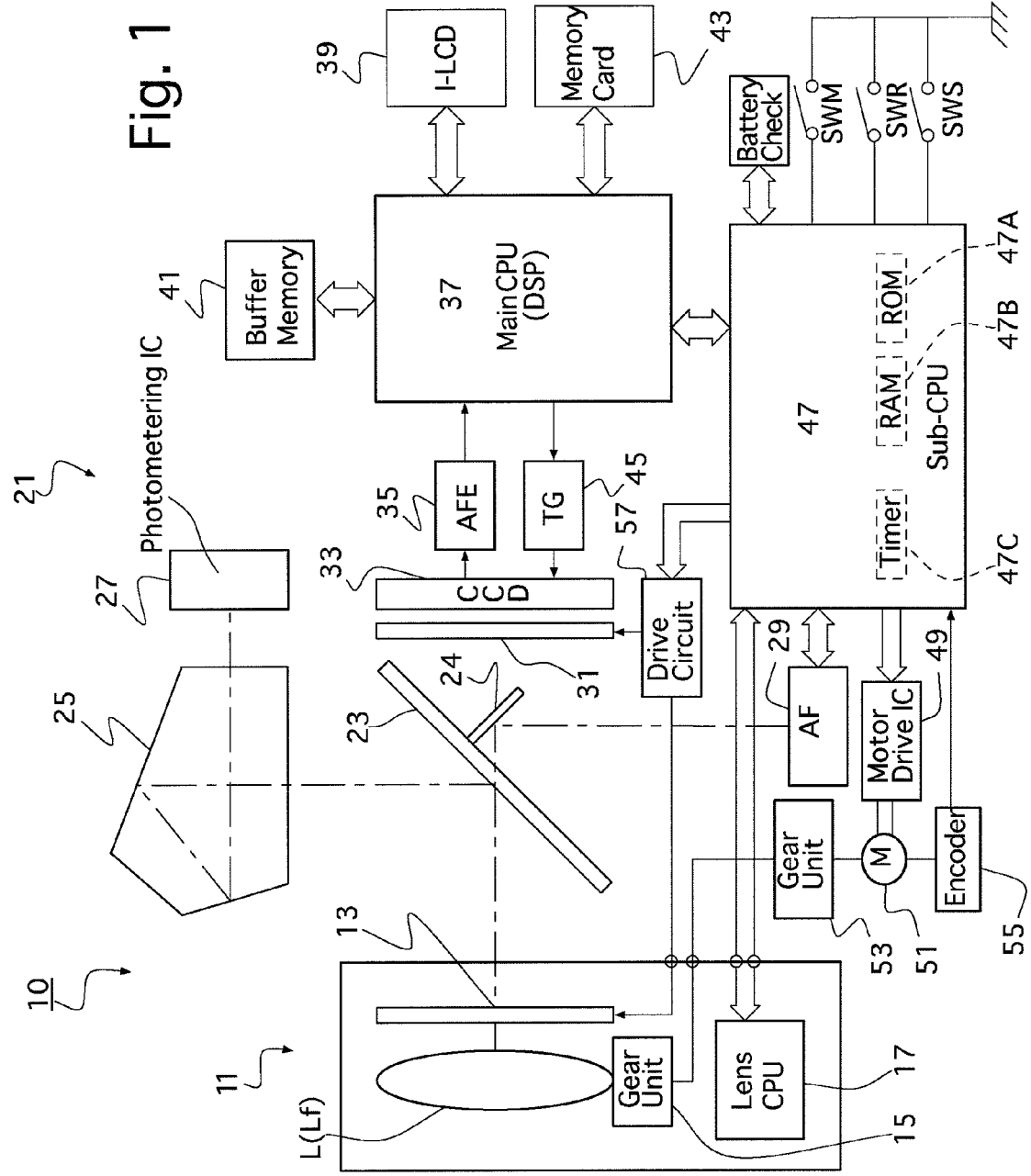
FIG. 1 is a block diagram of main components of an embodiment of an SLR digital camera system according to the present invention.

An embodiment of an SLR digital camera system 10 according to the present invention is provided with an interchangeable lens 11 and a camera body 21 to which the interchangeable lens 11 is detachably attached.

The interchangeable lens 11 is provided with a photographing lens group L and an adjustable diaphragm 13. The photographing lens group L provided as a photographing optical system includes a focusing lens group Lf. The interchangeable lens 11 is further provided with a gear unit 15 and a lens CPU 17. The gear unit 15 is associated with the focusing lens group Lf to drive the focusing lens group Lf, and the lens CPU 17 controls the overall operation of the interchangeable lens 11. In a state where the interchangeable lens 11 is mounted on the camera body 21, a lens driving force is transmitted from the camera body 21 side to the focusing lens group Lf via the gear unit 15 to drive the focusing lens group Lf along an optical axis, and the lens CPU 17 carries out communication with a main CPU 37 incorporated in the camera body 21 to transmit and receive information on the interchangeable lens 11 to and from the camera body 21.

The camera body 21 is provided therein with the main CPU (DSP) 37 and a sub-CPU 47. The main CPU 37 processes digital image signals, and the sub-CPU 47 controls the overall operations and functions of the camera system such as AF operation and carries out communications with the lens CPU 17.

An object-emanated light bundle which is passed through the photographing lens group L and the aperture of the adjustable diaphragm 13 is mostly reflected by a main mirror 23 to be led to a viewfinder optical system (pentagonal prism) 25, and part of the incident light on the viewfinder optical system 25 enters a photometering IC 27. Part of the object-emanated light incident on the main mirror 23 passes through the main mirror 23 and is reflected by a sub-mirror 24 to be incident on an AF module 29. The sub-CPU 47 is provided therein with a ROM 47a, a RAM 47b and a timer 47c. Programs are stored in the ROM 47a, variables are written into and read out of the RAM 47b, and the timer 47c counts the exposure time and the interval time.

Although the main mirror 23 is in an image viewing position (the position shown in FIG. 1) when the user views an object image through the viewfinder optical system 25, the main mirror 23 is moved up to the photographing position (retracted position) upon a shutter release, and thereupon the sub-mirror 24 comes into intimate contact with the back of the main mirror 23 to be retracted from the photographing optical path. Thereafter, upon a shutter 31 being opened, an object image is formed on a CCD image sensor 33. This object image is converted into an analog image signal by the CCD image sensor 33, and this analog image signal is amplified and converted into a digital signal by an AFE (analog front end) 35 to be output to the main CPU 37.

The operation of the shutter 31 is controlled by the sub-CPU 47 via a drive circuit 57. The operation of the adjustable diaphragm 13 of the interchangeable lens 11 is also controlled by the sub-CPU 47 via the drive circuit 57. The operation of the CCD image sensor 33 is controlled by the main CPU 37 via a TG (timing generator) 45. The CCD image sensor 33 can be replaced by a CMOS image sensor as an alternative image sensor.

The camera body 21 is provided with a monitor (I-LCD) 39 for visually indicating photographic data necessary for picture taking and for visually indicating photographed (captured) images. Data displayed on the monitor 39 is controlled by the main CPU 37. Specifically, the main CPU 37 makes the monitor 39 display data (various information) necessary for picture taking when the camera is in a picture taking mode (recording mode), and the main CPU 37 reads out captured images recorded in a buffer memory 41 or a removable memory card 43 therefrom and makes the monitor 39 display the captured images when the camera is in a playback mode.

Note that the image sensor 33, the AFE 35, the main CPU 37, the TG 45 and the buffer memory 41 constitute an imaging system of the digital camera.

The AF module 29 is of a so-called TTL phase-difference-detection type. The AF module 29 is provided with a plurality of pairs of line sensors which receive object-emanated light bundles which are passed through the photographing lens group L and a half-mirror portion of the main mirror 23 and reflected by the sub-mirror 24. An object image within a selected distance detection area is divided into two areas to be formed on the associated pair of line sensors, respectively. The pair of image signals output from each pair of line sensors are input to the sub-CPU 47 as focus detection signals. The sub-CPU 47 determines the amount of defocus which corresponds to the amount of displacement from a predetermined focal plane to the current object image plane in the optical axis direction from the phase difference (distance) between the pair of image signals, and also the sub-CPU 47 calculates the moving direction and the amount of movement of the focusing lens group (lens drive amount) Lf which are required to bring the target object into focus. Thereafter, the sub-CPU 47 drives an AF motor 51 via a motor drive IC 49 in accordance with the lens drive amount, and this rotation of the AF motor 51 is transmitted to the gear unit 15 of the interchangeable lens 11 via a gear unit 53 of the camera body 21 to move the focusing lens group Lf along the optical axis thereof to bring an object into focus. Namely, the focusing lens group Lf is moved to a position where the absolute value of the amount of defocus becomes zero. The lens drive amount is calculated as the number of pulses detected by an encoder 55 for detecting the amount of rotation of the AF motor 51, and the operation of the AF motor 51 is controlled in accordance with the number of pulses detected by the encoder 55. The focus detection process includes a series of operations until the lens drive amount is calculated, and the lens drive process includes a process of driving the AF motor 51 in accordance with the lens drive amount.

The sub-CPU 47, the AF module 29, the motor drive IC 49, the encoder 55, the AF motor 51 and the gear unit 53 constitute an AF system of the digital camera.

Switches such as a main switch SWM, a photometering switch (first switch) SWS, a release switch (second switch) SWR are connected to the sub-CPU 47. The main switch SWM is for turning ON and OFF the power within the camera body 21. Upon the main switch SWM being turned ON, the sub-CPU 47 supplies power from a battery (not shown) to other components in the camera body 21. Upon the main switch SWM being turned OFF, the sub-CPU 47 stops supplying power from the battery, and the camera system enters into a sleep mode in which the state of the main switch SWM is checked at fixed intervals. The photometering switch SWS and the release switch SWR are associated with a shutter release button (not shown) of the camera body 21 in a known manner. Specifically, the photometering switch SWS is turned ON upon the shutter release button being pressed halfway, and the release button SWR is turned ON with the photometering switch SWS remaining ON upon the shutter release button being fully depressed.

The camera body 21 is provided with the following conventional mechanisms (not shown in the drawings): a mirror charge mechanism for moving the main mirror 23 up and down, a shutter charge mechanism for opening and shutting the shutter 31, a motor for charging these charge mechanisms, and a charge release mechanism for releasing these charge mechanisms. Upon the release switch SWR being turned ON, the sub-CPU 47 releases the mirror charge mechanism to move the main mirror 23 to the up position (retracted position), subsequently releases the shutter charge mechanism so that the leading curtain and the trailing curtain of the shutter 31 move in that order. After the completion of movement of the trailing curtain, the mirror charge mechanism and the shutter charge mechanism are recharged while the main mirror 23 is moved down to the image viewing position (the position shown in FIG. 1).

The present embodiment of the digital camera system performs a lens drive process as an AF process (AF mode) in which a focus state is detected in order to move the focusing lens group Lf to an in-focus position upon the photometering switch SWS being turned ON. Thereafter, if it is determined that an in-focus state is obtained by the subsequent focus detection process, the digital camera system can operate in the following two AF modes: a first AF mode (AF-S mode) in which at least the focus-lens-group driving operation is suspended while the photometering switch SWS is held ON, and a second AF mode (AF-C mode) in which the focus detection process and the focus-lens-group driving operation are repeated while the photometering switch SWS is held ON. The focus detection process is a process in which an amount of defocus is detected from the phase difference between a pair of object images detected by the AF module 29, and in which the moving direction and the amount of movement (lens drive amount) of the focusing lens group Lf which are required to bring the focusing lens group Lf to a position where the detected amount of defocus becomes zero, i.e., to bring the target object into focus. The focus detection process and the lens drive process can be repeated while the main mirror 23 is in the image viewing position.

Additionally, in the present embodiment of the digital camera system, in an AF-A process (moving object determination process) constituting an a third AF mode (AF-A mode), it is determined whether or not the target object is a moving object by detecting motion of the target object in the optical axis direction by detecting variations in defocus amount by repeating the focusing detection process without moving the focus lens group Lf. In the present embodiment of the digital camera system, it is determined that the target object is a moving object when the object image continuously moves in the same direction if the detected amount of defocus is below a predetermined value. For instance, in the case where a large change occurs in the object image, there is a high possibility of the composition being changed, so that the target object is not determined as a moving object in this particular case. A known focus detection process, a known lens drive process and a known moving object determination operation can be adopted as the focus detection process, the lens drive process and the moving object determination operation that have been described above, respectively.

A continuous shooting mode is available in the present embodiment of the digital camera system. When the AF-A mode is selected in continuous shooting mode, an AF-C mode and the AF-A mode are switched during continuous shooting as necessary. The AF-A process determines whether or not the target object is a moving object simply by repeating the focus detection process.

Upon the buffer memory 41 becoming full during continuous shooting with the AF-A mode selected, the AF-A process determines whether or not the target object is a moving object during an image file transfer process in which picture taking is suspended and image files are transferred from the buffer memory 41 to the memory card 43 with the camera system being held in continuous shooting mode. If it is determined that the target object is a moving object, the focusing lens group Lf is driven in the AF-C mode. Thereafter, upon the buffer memory 41 emptying by at least a predetermined amount of memory space as a result of transferring image files stored in the buffer memory 41 to the memory card 43, control resumes the photographing process (continuous shooting process). If it is determined that the target object is not a moving object and that the target object is in focus, control simply waits for the buffer memory 41 to empty and resumes shooting upon the buffer memory 41 becoming empty.

Figure 2:
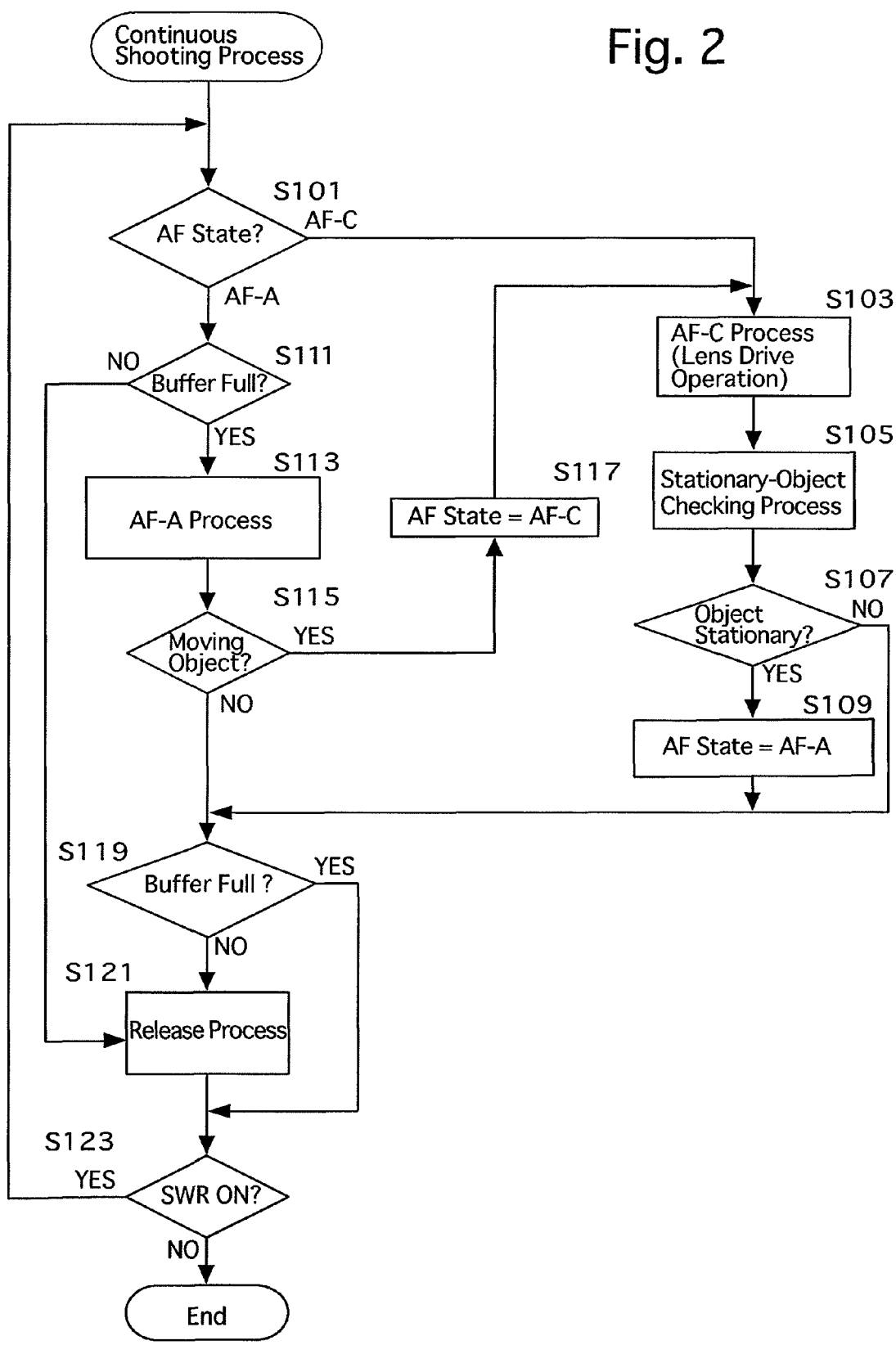
FIG. 2 is a flow chart showing operations of a continuous shooting process performed in the SLR digital camera system shown in FIG. 1.

The details of the continuous shooting process (continuous shooting operation) in which the AF-A process is performed will be hereinafter discussed with reference to the flow chart shown in FIG. 2. Control performs this continuous shooting process in which the AF-A process or the AF-C process is performed upon the photometering switch SWS and the release switch SWR being turned ON in the continuous shooting mode. When AF-S mode is selected, control can enter the continuous shooting process by first completing the AF process and thereafter transferring to the AF-A mode. When the release switch SWR is turned ON before an in-focus state is obtained, the camera can be in either a release priority mode, in which control aborts the focus detection process and the lens drive process to enter the continuous shooting process even if the camera is out of focus, or AF priority mode, in which control commences the continuous shooting process after an in-focus state is obtained.

Upon commencing the continuous shooting process, control checks an AF state (step S101). In this particular embodiment, it is determined whether the camera is in the AF-A mode or the AF-C mode.

[AF-C]

If the camera is in the AF-C mode (if AF-C at step S101), a focusing detection operation and a lens drive operation (in which the focusing lens group Lf is driven for focusing) are performed in the AF-C process (step S103). Thereafter, it is determined whether or not the target object is stationary via a stationary-object checking process (step S105). In the stationary-object checking process, it is determined whether or not the target object is stationary by detecting whether or not an in-focus state was achieved by the focus detection process performed after the focusing lens group Lf was driven to the in-focus position via the AF-C process.

Subsequently, if it is determined that the target object is stationary (if YES at step S107), control sets the AF state to AF-A mode (step S109), and subsequently proceeds to step S119. If it is determined that the target object is not stationary (if NO at step S107), control simply proceeds to step S119, so that the AF-C mode is maintained.

At step S119, it is determined whether or not the buffer memory 41 is full. If the buffer memory 41 is not full (if NO at step S119), a shutter release process is performed (step S121) and it is determined whether or not the release switch SWR is ON (step S123). If the release switch SWR is ON (if YES at step S123), control returns to step S101. The shutter release process at step S121 is a process of capturing an object image at a set shutter speed with a selected F-number and subsequently storing the captured object image into the buffer memory 41.

In the case where the target object is not stationary (if NO at step S107), the AF-C mode is maintained as described above, so that the focus detection process and the lens drive process are performed every time the shutter 31 is released, and accordingly, an in-focus state or a substantially in-focus state is maintained.

[AF-A Process]

If it is determined that the camera is in the AF-A mode (if AF-A at step S101), it is determined whether or not the buffer memory 41 is full (step S111). If the buffer memory 41 is not full (if NO at step S111), control proceeds to step S121. If the buffer memory 41 is full (if YES at step S111), the AF-A process is performed (step S113) and subsequently it is determined whether or not the target object is a moving object (step S115). If the target object is not a moving object (if NO at step S115), control proceeds to step S119. If the target object is a moving object (if YES at step S115), control sets the AF state to the AF-C mode (step S117) and subsequently proceeds to step S103. Accordingly, due to the AF-A mode, control skips the AF-C process and proceeds to the shutter release process (step S121) if it is determined that the target object is not a moving object, which makes a continuous shooting operation (continuous shooting process) at high speed possible, and control sets the AF state to the AF-C mode and performs the AF-C process if it is determined that the target object is a moving object, which makes it possible to take pictures (capture object images) in an in-focus state or an approximate in-focus state.

When the buffer memory 41 becomes full, the image files stored in the buffer memory 41 are transferred to the memory card 43 under control of the main CPU 37. Thereafter, upon the buffer memory 41 emptying or upon the buffer memory 41 emptying by a predetermined amount, this condition of the buffer memory 41 is transferred from the main CPU 37 to the sub-CPU 47, and control resumes the shooting process.

As described above, when performing a continuous shooting operation, the present embodiment of the digital camera system performs a high-speed continuous shooting process in which object images are continuously captured in rapid succession while the up/down operation of the main mirror 23 and the shutter charge/release operation of the shutter 31 are repeated in an AF lock state, and in which the object images thus captured are stored in the buffer memory 41; however, upon the buffer memory 41 becoming full, the image capturing operation is suspended and thereupon control commences the AF-A process and thereafter enters the AF-C process to perform an AF process. In the case where it is determined that the target object is not a stationary object before the buffer memory 41 becomes full or that the target object is a moving object, the AF-C process is performed every time the shutter 31 is released, so that the digital camera system can perform a continuous shooting operation while maintaining an in-focus state or an approximate in-focus state. Since an AF process is performed to achieve focus when the buffer memory 41 becomes full as described above, a problem with a high-speed continuous shooting operation continuing to be performed in an out-of-focus state does not occur.

Although a necessary condition for suspending the shutter release (photographing) process is when the buffer memory becomes full in the above described embodiment of the digital camera system, this necessary condition can be when taking a predetermined number of pictures at rapid succession is completed or when the amount of displacement of an object image plane is extremely great in the AF-A process (e.g., when the camera is panned).

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A digital camera comprising:
    an imaging system which performs a photographing operation and records captured image files in a buffer memory;
    an AF system which performs a focus-state detection process, in which said AF system detects a focus state, and a focusing lens group driving process, in which said AF system moves a focusing lens group to an in-focus position;
    a first switch that actuates said AF system; and
    a second switch that actuates said imaging system,
    wherein, while said first switch and said second switch are held ON, said digital camera performs a continuous shooting process in which said imaging system repeatedly performs said photographing operation and said AF system repeatedly performs said focus-state detection process,
    wherein, upon said buffer memory becoming full during said continuous shooting process, said imaging system suspends said photographing operation and said AF system performs said focus-state detection process and said focusing lens group driving process; and
    wherein said AF system operates in one of following three AF modes:
    a first AF mode in which said AF system performs said focus-state detection process and said focusing lens group driving process upon said first switch being turned ON, and in which said AF system suspends said focusing lens group driving process while said first switch is held ON upon an in-focus state being obtained;
    a second AF mode in which said AF system repeats said focus-state detection process and said focusing lens group driving process while said first switch is held ON even upon an in-focus state being obtained; and
    a third AF mode in which said AF system repeats only said focus-state detection process while said first switch is held ON to determine whether a target object is a moving object, and
    wherein, during said continuous shooting process, said AF system operates in one of said second AF mode and said third AF mode.

2. The digital camera according to claim 1, wherein said imaging system transfers said captured image files stored in said buffer memory to another memory when said buffer memory becomes full during said continuous shooting process, and resumes performing said photographing operation immediately after said imaging system finishes transferring said captured image files stored in said buffer memory to said another memory.

3. The digital camera according to claim 1, wherein said AF system determines whether said target object is stationary after operating in said second AF mode when said buffer memory becomes full; and
    wherein said AF system determines that said target object is a moving object during said third AF mode, and thereafter said AF system enters said third AF mode when said AF system determines that said target object is stationary.

4. The digital camera according to claim 1, wherein said AF system remains operating in said second AF mode when said AF system determines that said target object is not stationary after operating in said second AF mode.

5. The digital camera according to claim 1, wherein said AF system enters into one of said second AF mode and said third AF mode to start performing said continuous shooting operation upon said second switch being turned ON when said AF system operates in said first AF mode with said first switch ON.

6. The digital camera according to claim 1, wherein said first switch and said second switch are a photometering switch and a release switch, respectively, which are associated with a shutter release button of said digital camera.

7. The digital camera according to claim 2, wherein said another memory comprises a removable memory card.

8. A digital camera comprising:
- an imaging system which performs a photographing operation and records captured image files in a buffer memory;
- an AF system which performs a focus-state detection process, in which said AF system detects a focus state, and a focusing lens group driving process, in which said AF system moves a focusing lens group to an in-focus position;
- a switch that actuates said AF system and said imaging system,
- wherein, while said switch is held ON, said digital camera performs a continuous shooting process in which said imaging system repeatedly performs said photographing operation and said AF system repeatedly performs said focus-state detection process,
- wherein, when said buffer memory becoming full or when taking a predetermined number of pictures is completed during said continuous shooting process, said imaging system suspends said photographing operation and said AF system performs said focus-state detection process and said focusing lens group driving process; and
- wherein said AF system operates in one of following three AF modes:
  - a first AF mode in which said AF system performs said focus-state detection process and said focusing lens group driving process upon said switch being turned ON, and in which said AF system suspends said focusing lens group driving process while said switch is held ON upon an in-focus state being obtained;
  - a second AF mode in which said AF system repeats said focus-state detection process and said focusing lens group driving process while said switch is held ON even upon an in-focus state being obtained; and
  - a third AF mode in which said AF system repeats only said focus-state detection process while said switch is held ON to determine whether a target object is a moving object, and
- wherein, during said continuous shooting process, said AF system operates in one of said second AF mode and said third AF mode.

9. The digital camera according to claim 8, wherein said imaging system transfers said captured image files stored in said buffer memory to another memory while said imaging system suspends said photographing operation, and resumes performing said photographing operation immediately after said imaging system finishes transferring said captured image files stored in said buffer memory to said another memory or said AF system finish said focus-state detection process and said focusing lens group driving process.

* * * * *